(12) United States Patent
Ren

(10) Patent No.: US 10,931,595 B2
(45) Date of Patent: Feb. 23, 2021

(54) CLOUD QUALITY OF SERVICE MANAGEMENT

(71) Applicant: Futurewei Technologies, Inc., Plano, TX (US)

(72) Inventor: Da Qi Ren, Saratoga, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/994,670

(22) Filed: May 31, 2018

(65) Prior Publication Data

US 2018/0351876 A1    Dec. 6, 2018

Related U.S. Application Data

(60) Provisional application No. 62/513,100, filed on May 31, 2017.

(51) Int. Cl.
*H04L 12/927* (2013.01)
*H04L 12/911* (2013.01)

(52) U.S. Cl.
CPC .......... *H04L 47/805* (2013.01); *H04L 47/808* (2013.01); *H04L 47/823* (2013.01)

(58) Field of Classification Search
CPC ... G06F 3/061; G06F 3/0631; H04L 41/5096; H04L 47/803; H04L 47/805; H04L 47/808; H04L 47/822; H04L 47/823
See application file for complete search history.

(56) References Cited

U.S. PATENT DOCUMENTS

| | | | |
|---|---|---|---|
| 8,250,581 B1* | 8/2012 | Blanding | G06F 9/5011 709/226 |
| 2008/0183871 A1* | 7/2008 | Ogawa | G06F 3/061 709/226 |
| 2009/0282414 A1* | 11/2009 | Branda | G06F 9/5038 718/103 |
| 2016/0241446 A1* | 8/2016 | Gupte | H04L 41/5096 |

* cited by examiner

*Primary Examiner* — Khoa Huynh
(74) *Attorney, Agent, or Firm* — Schwegman Lundberg & Woessner, P.A.

(57) ABSTRACT

A computer-implemented method of allocating cloud resources is provided that comprises: receiving, by a cloud host, data that identifies, for an application, a relationship between consumption of a first resource type and consumption of a second resource type; determining, by the cloud host, a consumption level of the first resource type of the application; and allocating, by the cloud host, one or more resources of the second resource type based on the identified relationship.

20 Claims, 9 Drawing Sheets

CUSTOMER PREFERENCE TABLE 210

| ENTITY ID | METRIC ID | ENTITY TYPE |
|---|---|---|
| 1234 | 1 | APPLICATION |
| 2345 | 2 | ORGANIZATION |
| 3456 | 3 | GROUP |

METRIC TABLE 230

| METRIC ID | RULE ID | RESOURCE1 | RESOURCE2 |
|---|---|---|---|
| 1 | 11 | 101 | 102 |
| 2 | 12 | 101 | 103 |
| 3 | 13 | 104 | NULL |

RULE TABLE 250

| RULE ID | RULE |
|---|---|
| 11 | IF ADDITIONAL RESOURCES OF RESOURCE1 ARE ALLOCATED, ALSO INCREASE ALLOCATION OF RESOURCE 2 |
| 12 | IF RESOURCES OF RESOURCE1 ARE DEALLOCATED, ALSO DECREASE ALLOCATION OF RESOURCE2 |
| 13 | IF QOS DROPS BELOW THRESHOLD, INCREASE RESOURCE1 |

FIG. 2

CLOUD QUALITY OF SERVICE MANAGEMENT

PRIORITY CLAIM

This application claims the benefit of priority to U.S. Provisional Patent Application Ser. No. 62/513,100, filed May 31, 2017, and titled "System and Methods to Support Efficient and Interactive Cloud QOS Management," which application is incorporated herein by reference in its entirety.

TECHNICAL FIELD

The present disclosure is related to cloud quality of service (QoS) management and, in particular, to systems and methods to support efficient and interactive cloud QoS management.

BACKGROUND

Applications hosted by a cloud service provider consume resources (e.g., processing resources, input/output (I/O) resources, network resources, and the like). A cloud service provider has finite resources to allocate to the numerous applications being hosted. Thus, one goal of a cloud service provider is to allocate sufficient resources to each application to meet QoS targets, without allocating substantially more resources than needed to meet those targets. Accordingly, cloud service providers increase allocation of a particular resource for an application when the application's performance drops below a QoS threshold due to insufficient allocation of the particular resource. Cloud service providers decrease allocation of the particular resource when the application's use of the resource drops below a predetermined threshold.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer-implemented method of allocating cloud resources is provided that comprises: receiving, by a cloud host, data that identifies, for an application, a relationship between consumption of a first resource type and consumption of a second resource type; determining, by the cloud host, a consumption level of the first resource type of the application; and allocating, by the cloud host, one or more resources of the second resource type based on the identified relationship.

Optionally, in any of the preceding aspects, the receiving of the data comprises receiving a customer preference data structure that identifies a quality of service (QoS) metric and a rule for the metric.

Optionally, in any of the preceding aspects, the allocating of the one or more resources of the second resource type is further based on the QoS metric and the rule for the metric.

Optionally, in any of the preceding aspects, the allocating of the one or more resources of the second resource type comprises: defining a maximum number of resources of the second resource type in the cloud host are allowed to be managed by the QoS metric and the rule for the metric.

Optionally, in any of the preceding aspects, the customer preference data structure identifies a second QoS metric and a second rule for the second metric, the second metric and the second rule applying to generic service level management (SLM) issues for every customer throughout an organization providing the customer preference data structure.

Optionally, in any of the preceding aspects, the customer preference data structure identifies a second QoS metric and a second rule for the second metric, the second metric and the second rule applying to service level management (SLM) issues for an identified customer group in an organization providing the customer preference data structure.

Optionally, in any of the preceding aspects, the QoS metric is an input/output (I/O) metric and the rule for the QoS metric specifies a minimum I/O rate for the application.

Optionally, in any of the preceding aspects, the QoS metric is a storage metric and the rule for the QoS metric specifies a minimum available storage size.

Optionally, in any of the preceding aspects, the first resource type is an input/output (I/O) resource type and the second resource type is a processor resource type.

Optionally, in any of the preceding aspects, the first resource type is an input/output (I/O) resource type and the second resource type is a storage resource type.

Optionally, in any of the preceding aspects, the first resource type is a processor resource type and the second resource type is a storage resource type.

According to one aspect of the present disclosure, a cloud host is provided that comprises: a memory storage comprising instructions; one or more processors in communication with the memory storage, wherein the one or more processors execute the instructions to perform operations comprising: receiving data that identifies, for an application, a relationship between consumption of a first resource type and consumption of a second resource type; determining a consumption level of the first resource type of the application; and allocating one or more resources of the second resource type based on the identified relationship.

Optionally, in any of the preceding aspects, the receiving of the data comprises receiving a customer preference data structure that identifies a quality of service (QoS) metric and a rule for the metric.

Optionally, in any of the preceding aspects, the allocating of the one or more resources of the second resource type is further based on the QoS metric and the rule for the metric.

Optionally, in any of the preceding aspects, the allocating of the one or more resources of the second resource type comprises: defining a maximum number of resources of the second resource type in the cloud host are allowed to be managed by the QoS metric and the rule for the metric.

Optionally, in any of the preceding aspects, the customer preference data structure identifies a second QoS metric and a second rule for the second metric, the second metric and the second rule applying to generic service level management (SLM) issues for every customer throughout an organization providing the customer preference data structure.

Optionally, in any of the preceding aspects, the customer preference data structure identifies a second QoS metric and a second rule for the second metric, the second metric and the second rule applying to service level management (SLM) issues for an identified customer group in an organization providing the customer preference data structure.

Optionally, in any of the preceding aspects, the QoS metric is an input/output (I/O) metric and the rule for the QoS metric specifies a minimum I/O rate for the application.

Optionally, in any of the preceding aspects, the QoS metric is a storage metric and the rule for the QoS metric specifies a minimum available storage size.

According to one aspect of the present disclosure, a non-transitory computer-readable medium is provided that stores instructions that, when executed by one or more processors, cause the one or more processors to perform operations comprising: receiving data that identifies, for an application, a relationship between consumption of a first resource type and consumption of a second resource type; determining a consumption level of the first resource type of the application; and allocating one or more resources of the second resource type based on the identified relationship.

Any one of the foregoing examples may be combined with any one or more of the other foregoing examples to create a new embodiment within the scope of the present disclosure.

BRIEF DESCRIPTION OF THE DRAWINGS

FIG. 2 is an illustration of a database schema suitable for cloud QoS management, according to some example embodiments.

DETAILED DESCRIPTION

Figure 1:
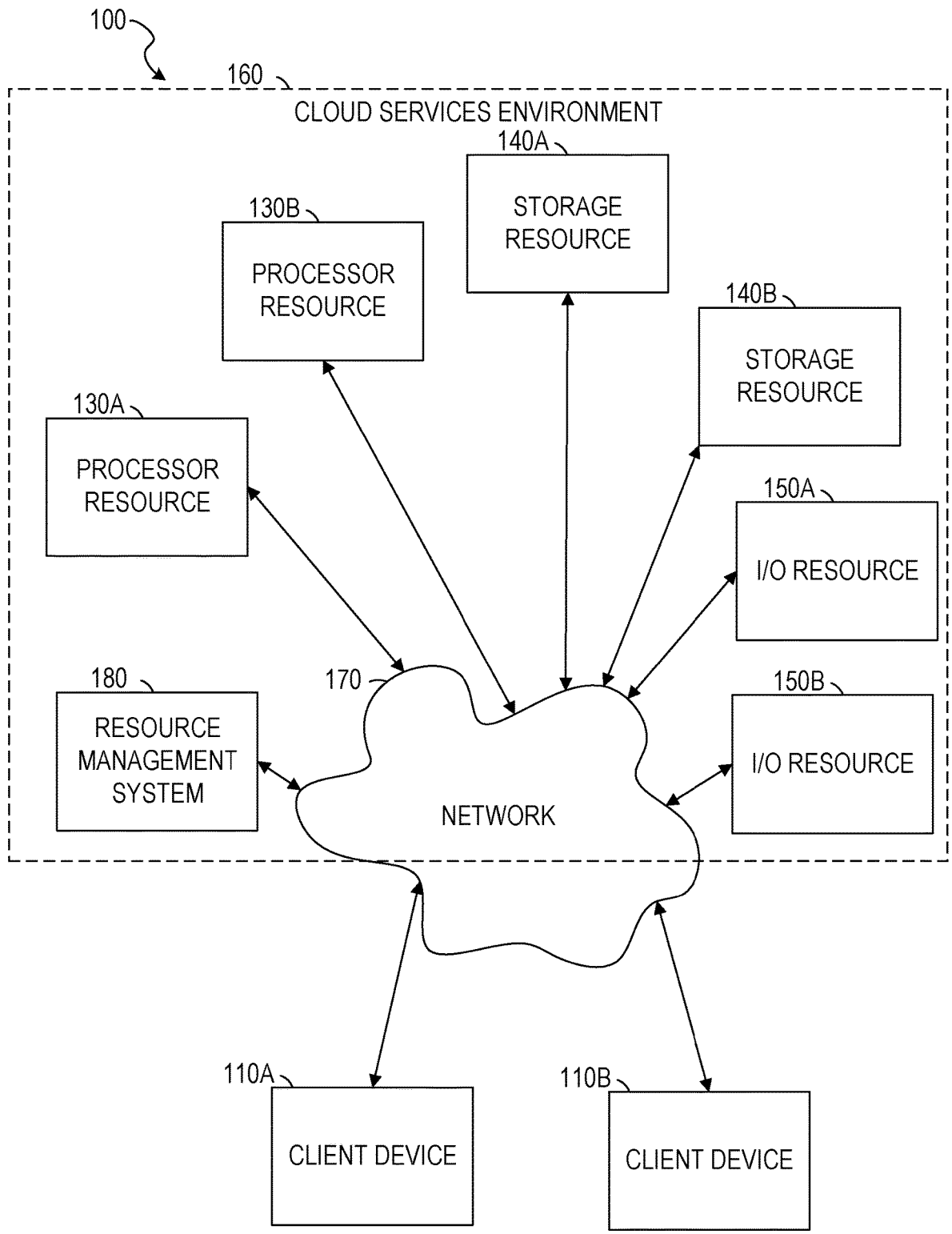
FIG. 1 is an illustration of a network environment suitable for cloud QoS management, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

Cloud service providers and cloud customers enter into a service level agreement (SLA) that defines a set of service level objectives and related performance indicators. These objectives concern aspects of the cloud service including availability, performance, security, and privacy. The service level objectives define measurable thresholds of service attributes, which the cloud service provider aims to meet in respect of the cloud service to be delivered. SLAs are specified by a set of metrics. Cloud capabilities are measured by QoS Metrics.

Acceptance by cloud customers of cloud service is based on determining whether the cloud service is meeting each of the defined service level objectives and taking corrective actions if the cloud service fails to meet one or more of the service level objectives. Determining if the cloud service is acceptable also includes monitoring of the state of key performance indicators (KPIs) defined in the SLA.

A customer of a cloud service provider may enter into an SLA with the cloud service provider whereby the cloud service provider agrees to provide cloud services that meet KPIs defined in the SLA. The SLA may include any criteria that can be objectively measured. For example, the cloud service provider may agree that an application will have at least a certain uptime percentage (e.g., 99.999% uptime), will have a response time below a defined threshold (e.g., 10 ms), will have data backed up periodically (e.g., every 10 minutes), will prevent unauthorized access to the application and its data, or any suitable combination thereof.

The cloud service provider allocates resources to applications. When a resource is allocated to an application, the resource becomes available to the application. For example, when a processor resource is allocated to an application, the application has use of the processor. Deallocation is the reverse process of allocation: when a resource is deallocated from an application, the application no longer has use of the resource. The cloud service provider attempts to avoid over- and under-allocation. Over-allocation occurs when more resources are allocated to an application than are needed for the application to perform at a target QoS. When over-allocation occurs, the cloud service provider consumes more power (e.g., by running processor cores that could have been kept idle) than necessary or purchases more resources than necessary (e.g., by buying or renting additional hardware to provide the over-allocated services). Under-allocation occurs when fewer resources are allocated to an application than are needed for the application to perform at the target QoS. When under-allocation occurs, the cloud service provider is in danger of failing to perform according to the SLA.

Using systems and methods described herein, a customer of the cloud service provider may provide customer preference data that indicates resource consumption patterns of a hosted application. Using the customer preference data, the cloud service provider identifies rules by which resources may be allocated or deallocated. These rules may be of arbitrary complexity, and thus may have a greater predictive value of the optimal allocation when compared to the simple rules implemented in existing systems. As a result, use of the database schema 200 may reduce resource under-allocation, resource over-allocation, or both. In the aggregate, the improved allocation of resources may allow the cloud service provider to host more applications than in prior art systems, using the same resources; to host the same applications, using fewer resources than in prior art systems; or to both host more applications and use fewer resources.

FIG. 1 is an illustration of a network environment 100 suitable for cloud QoS management, according to some example embodiments. The network environment 100 includes cloud services environment 160 in communication with client devices 110A and 110B via a network 170. The cloud services environment 160 includes a resource management system 180, processor resources 130A and 130B, storage resources 140A and 140B, and input/output (I/O) resources 150A and 150B. The resources may be connected to each other via an internal network, via the network 170, or any suitable combination thereof.

A cloud services provider hosts one or more applications for a customer of the cloud services. For example, a customer using the client device 110A may provide an application to the cloud services provider for execution on one or more processor resources. The processor resources may access data from one or more storage resources, store data in one or more storage resources, receive data via a network or from input devices, send data via the network or to output devices, or any suitable combination thereof. Any one or more of the client devices 110, the processor resources 130, the storage resources 140, the I/O resources 150, and the resource management system 180 may be implemented by a computer system described below in FIG. 3.

FIG. 2 is an illustration of a database schema 200 suitable for cloud QoS management, according to some example embodiments. The database schema 200 includes a customer preference table 210, a metric table 230, and a rule table 250. The customer preference table 210 is defined by a table definition 215, including an entity identifier field, a metric identifier field, and an entity type field, and includes rows 220A, 220B, and 220C. The metric table 230 is defined by a table definition 235, including a metric identifier field, a rule identifier field, and two resource fields. The rule table 250 is defined by a table definition 255, include a rule identifier field and a rule field. Taken together, the data stored in the database schema 200 identifies rules by which resources may be allocated or deallocated by the resource management system 180. These rules may be of arbitrary complexity, and thus may have a greater predictive value of the optimal allocation when compared to the simple rules implemented in existing systems. As a result, use of the database schema 200 may reduce resource under-allocation, resource over-allocation, or both.

Each of the rows 220A-220C stores information for a customer preference. The entity identifier identifies the entity that the customer preference applies to. For example, the entity identifier may identify an individual, a company, a department, or any suitable combination thereof. The metric identifier corresponds to an entry in the metric table 230, and indicates the metric to be applied. The entity type identifies a type of the entity. For example, a customer preference for an application entity may reference a metric that applies to the application identified by the entity identifier, while a customer preference for an organization entity may reference a metric that applies to all applications associated with the organization. Additional tables may identify the relationships between organizations, groups within organizations, and individual applications.

Each of the rows 240A-240C stores information for a metric. The metric identifier is a unique identifier for the metric. The rule identifier identifies a rule in the rule table 250 to be applied. The two resource identifiers identify resources to which the rule applies. The resource identifiers may correspond to entries in a resource table. For example, resource identifier "101" may indicate a processor resource, resource identifier "102" may indicate a storage resource type, resource identifier "103" may indicate an I/O resource type, and resource identifier "104" may indicate a hardware accelerator resource type.

Each of the rows 260A-260C stores information for a rule. The rule identifier is a unique identifier for the rule. The rule defines an action to be taken when a condition is met. Thus, the rule identifier "11" corresponds to a rule that will determine if additional resources of a first resource type are allocated and, in response, increase allocation of resources of a second resource type. The example rule of the row 260B determine if resources of a first resource type are deallocated and, in response, decreases allocation of resources of a second resource type. The example rule of the row 260C determines if the QoS drops below a threshold and, in response, increases allocation of the first resource type.

The resource management system 180 may use the database schema 200 to manage the resources of the cloud services environment 160. For example, the resource management system 180 can monitor the performance of hosted applications and periodically check to see if any corrective action needs to be taken. The resource management system 180 may query the database to identify metrics and rules that apply to each application and allocate or deallocate resources based on the identified metrics and rules.

Figure 3:
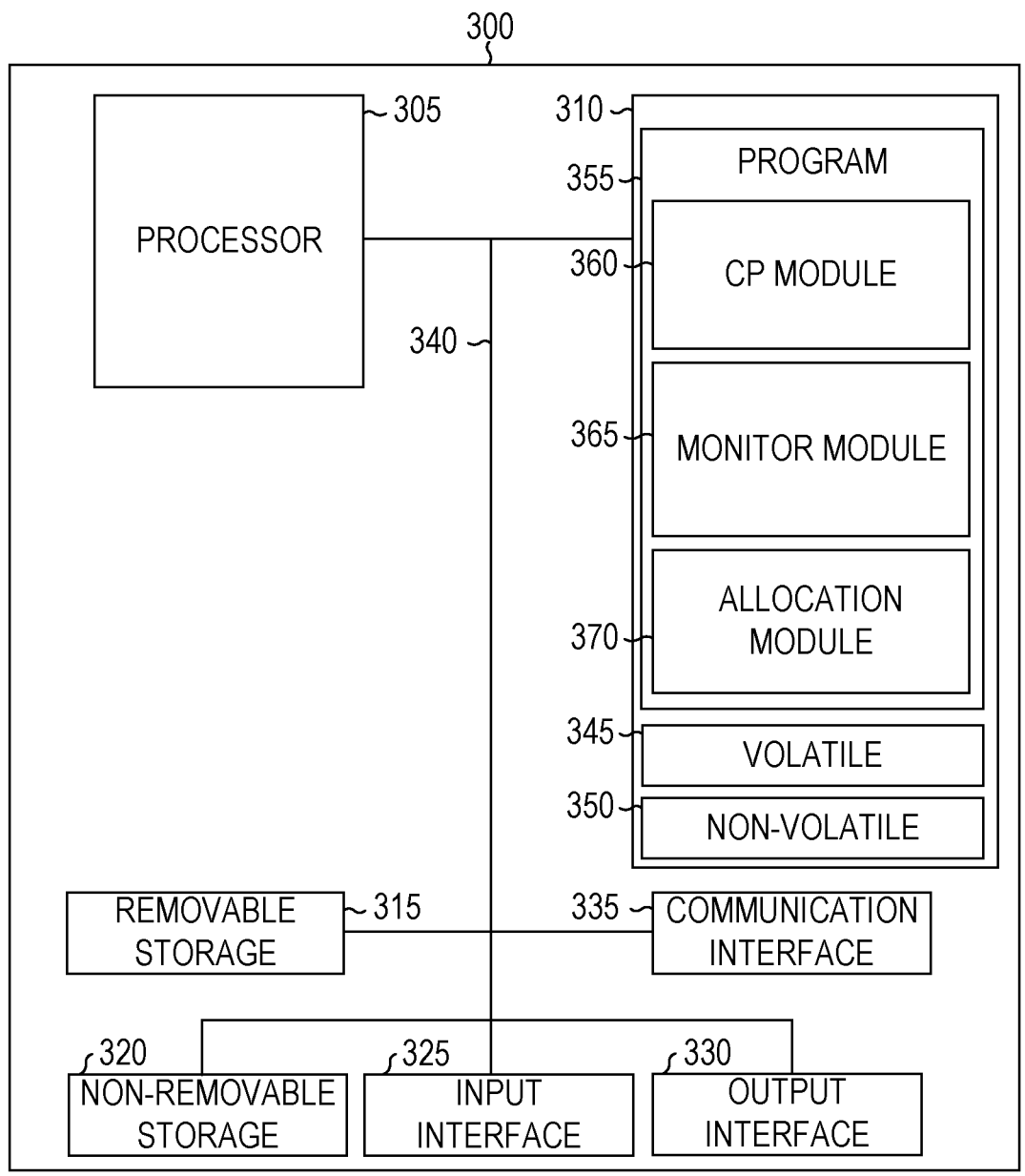
FIG. 3 is a block diagram illustrating circuitry for clients and servers that implement algorithms and perform methods, according to some example embodiments.

FIG. 3 is a block diagram illustrating circuitry for implementing algorithms and performing methods, according to example embodiments. All components need not be used in various embodiments. For example, the clients, servers, and cloud-based network resources may each use a different set of components, or in the case of servers for example, larger storage devices.

One example computing device in the form of a computer 300 (also referred to as computing device 300 and computer system 300) may include a processor 305, memory storage 310, removable storage 315, non-removable storage 320, input interface 325, output interface 330, and communication interface 335, all connected by a bus 340. Although the example computing device is illustrated and described as the computer 300, the computing device may be in different forms in different embodiments.

The memory storage 310 may include volatile memory 345 and non-volatile memory 350, and may store a program 355. The computer 300 may include—or have access to a computing environment that includes—a variety of computer-readable media, such as the volatile memory 345, the non-volatile memory 350, the removable storage 315, and the non-removable storage 320. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 355 stored in the memory 310) are executable by the processor 305 of the computer 300. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 355 may utilize a customer preference structure using modules such as a customer preference module 360, a monitor module 365, and an allocation module 370. Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The customer preference module 360 may access customer preference data structures (e.g., the customer preference data structure 800 of FIG. 8, discussed below, the customer preference table 210 of FIG. 2, discussed above, or both), modify customer preference data structures, convert customer preference data structures from one form to another, or any suitable combination thereof. For example, a customer may provide a customer preference data structure 800 to the customer preference module 360, which saves the received data into the database schema 200.

The monitor module 365 may monitor applications running on the cloud service environment 160. For example, the monitor module 365 may monitor uptime of each application, response time of each application, consumption of allocated resources, or any suitable combination thereof.

The allocation module 370 may allocate resources to applications running on the cloud service environment 160, deallocate resources from applications running on the cloud service environment 160, or both. In some example embodiments, the allocation module 370 accesses data generated by the monitor module 365 and the customer preference module 360 to determine if, based on rules of the customer preference data, resources should be allocated or deallocated. In response to the determination, the allocation module 370 may allocate or deallocate resources. For example, if the monitor module 365 determines that an application has a response time of 100 ms and the customer preference module 360 reports that a rule for the application specifies that additional I/O resources should be allocated if the application has a response time that exceeds 50 ms, the allocation module 370 may allocate I/O resources to the application.

Figure 4:
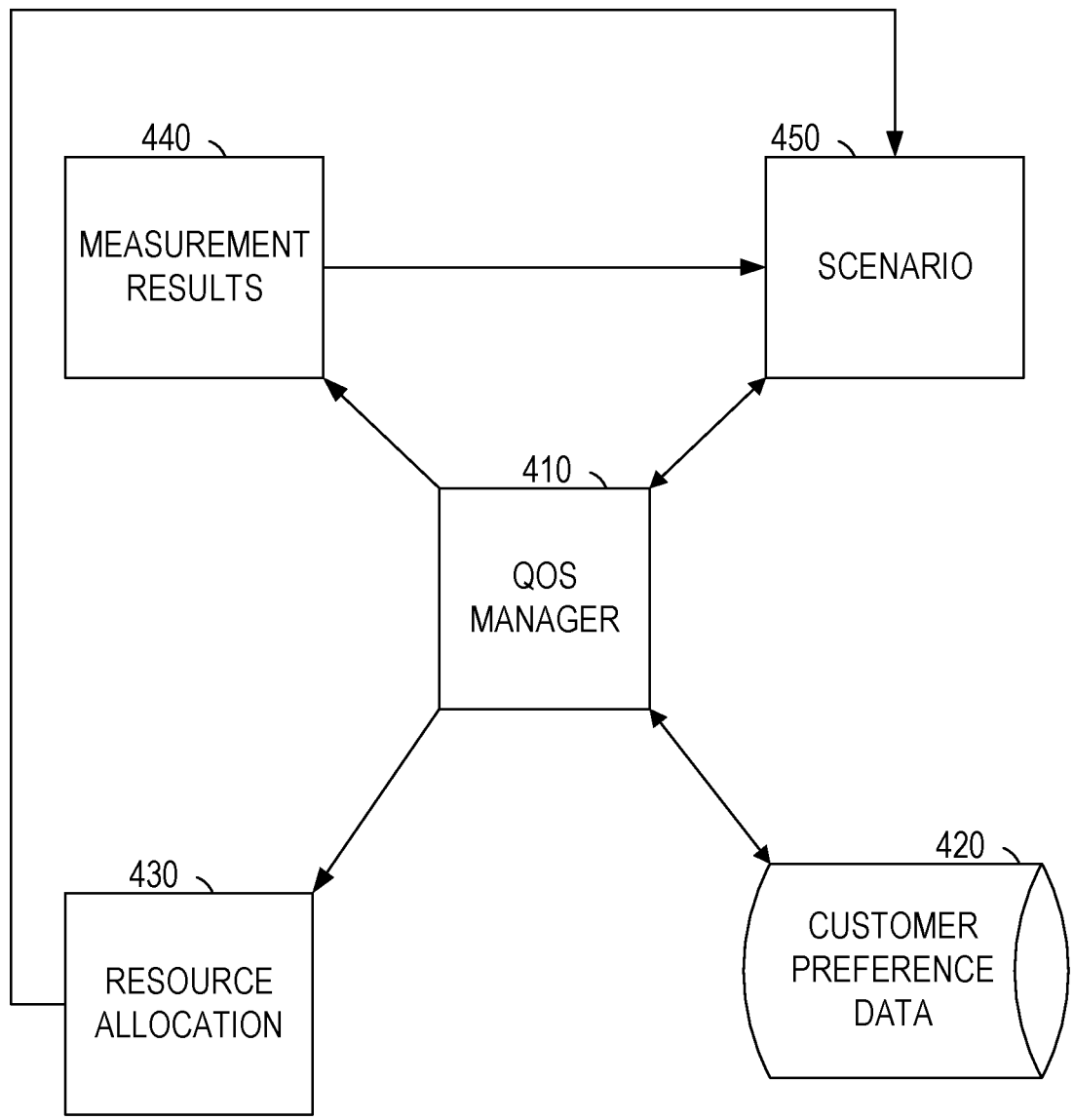
FIG. 4 shows a usage of a customer preference in cloud QoS management, according to some example embodiments.

FIG. 4 shows a usage of a customer preference in cloud QoS management, according to some example embodiments. The QoS manager 410 accesses customer preference data 420 for use in resource allocation 430. The QoS manager 410 generates measurement results 440 of the performance for the customer. The measurement results 440 and resource allocation 430 are combined into a scenario 450. Based on the scenario 450, the QoS manager 410 may modify the resource allocation 430, the customer preference 420, or both. The QoS manager 410 may be implemented by the resource management system 180. The customer preference data 420 may be stored in a database using the database schema 200.

The measurement results 440 indicate one or more KPIs for the customer. For example, uptime of each application of the customer, response time statistics of each application of the customer (e.g., minimum response time, maximum response time, mean response time, median response time, number of responses, or any suitable combination thereof), and whether or not QoS metrics for the customer are met may be stored for each customer. In some example embodiments, the customer preference data 420 includes customer preferences of multiple customers, the resource allocation 430 allocates resources for the multiple customers, the measurement results 440 includes measurement results for the multiple customers, and the scenario 450 includes one or more scenarios for each of the multiple customers.

The scenario 450 pairs the resource allocation 430 and the measurement results 440 to show a relationship between the two. Thus, the QoS manager 410 may attempt an initial allocation of resources, measure the results of that allocation, and determine that the scenario involved over- or under-allocation of resources. Based on this determination, the resource allocation 430 may be modified to allocate or deallocate resources, and the cycle repeated. Past scenarios may be stored and used by the QoS manager 410 in making the adjustments. Additionally, the customer preference data 420 may be used in making the adjustments. For example, if the customer preference data 420 includes the rule of row 260A, and the scenario 450 indicates that the current resource allocation 430 and the current load resulted in needing additional resources of the first identified type (e.g., additional processor resources), additional resources of the second identified type (e.g., additional storage resources) may also be allocated.

Figure 5:
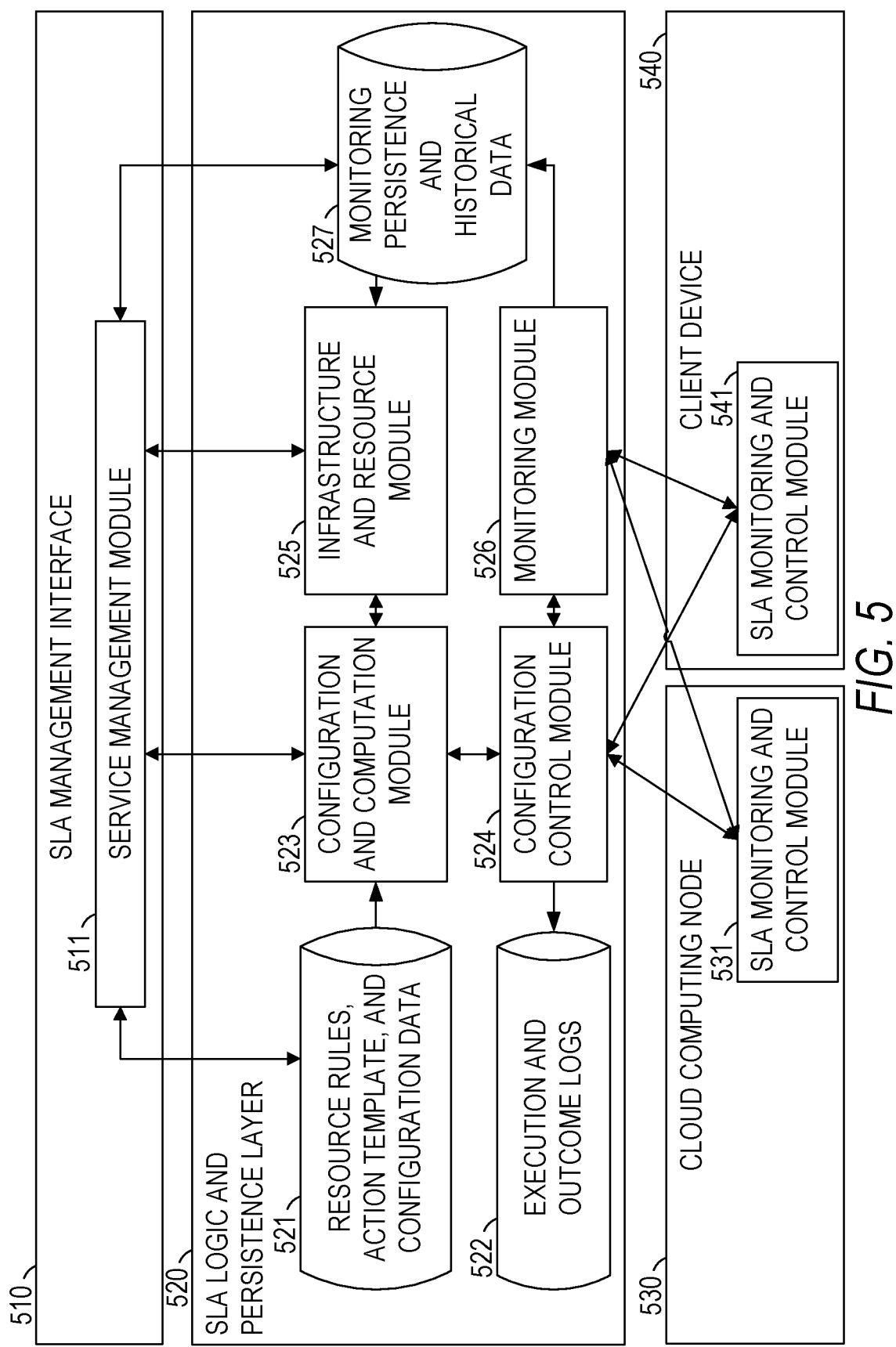
FIG. 5 shows a usage of a customer preference in cloud QoS management, according to some example embodiments.

FIG. 5 shows a usage of a customer preference in cloud QoS management, according to some example embodiments. Shown in FIG. 5 are an SLA management interface 510 and an SLA logic and persistence layer 520 in communication with a cloud computing node 530 and a client device 540. The SLA management interface 510 includes the service management module 511. The SLA logic and persistence layer 520 includes resource rules, action template, and configuration data 521, execution and outcome logs 522, a configuration and computation module 523, a configuration control module 524, an infrastructure and resource module 525, a monitoring module 526, and monitoring persistence and historical data 527. The cloud computing node 530 includes an SLA monitoring and control module 531. The client device 540 includes an SLA monitoring and control module 541.

The SLA management interface 510 and the SLA logic and persistence layer 520 may be components of the resource management system 180 or the QoS manager 410. The cloud computing node 530 may comprise one or more of the resources 130A, 130B, 140A, 140B, 150A, or 150B of FIG. 1, and be allocated by the resource allocation 430. The client device 540 may be the client device 110A or 110B of FIG. 1.

The SLA logic and persistence layer 520 collects and maintains data used by the configuration control module 524 to allocate resources to customers and applications. Each cloud computing node 530 includes the SLA monitoring and control module 531, which allocates resources of the cloud computing node 530 and monitors performance of applications using resources of the cloud computing node 530. The SLA monitoring and control module 531 may receive allocation instructions from the configuration control module 524 that control the allocation of resources of the cloud computing node 530 to applications. The SLA monitoring and control module 531 may provide data to the monitoring module 526 regarding the performance of the resources of the cloud computing node 530, the applications utilizing the resources of the cloud computing node 530, or both.

The SLA monitoring and control module 541 of the client device 540 may retrieve monitoring data from the monitoring module 526 for one or more applications, one or more cloud computing nodes 530, or any suitable combination thereof. The client device 540 may present a user interface to a customer of the cloud services provider to enable the customer to monitor the resource allocations and application performance. The user interface may also enable the customer to create or modify customer preference data to be used by the configuration control module 524 in allocating resources.

Data used by the configuration control module 524 includes the resource rules, action template, and configuration data 521, the execution and outcome logs 522, and the monitoring persistence and historical data 527. The resource rules, action template, and configuration data 521 includes general rules for resource allocation. For example, default resource allocation to applications (e.g., a predetermined number of processor resources, a predetermined number of I/O resources, and a predetermined number of storage resources), default rules for modifying resource allocations in response to application performance (e.g., a default rule of increasing processor resources when allocated processor resources are at least 95% utilized or a default rule of decreasing processor resources when allocated processor resources are no more than 20% utilized), or both may be stored in the resource rules, action template, and configuration data 521. The execution and outcome logs 522 includes log data from the execution of applications. For example, a running application using resources of the cloud computing node 530 may generate log files that are provided to the SLA logic and persistence layer 520 by the SLA monitoring and control module 531 and stored in the execution and outcome logs 522. Data in the monitoring persistence and historical data may receive data from the monitoring module 526 for long-term storage and access by the infrastructure and resource module 525.

In some example embodiments, a general relational database is created that that stores QoS data. A cloud monitor (e.g., the monitoring module 526, the SLA monitoring and control module 531, or both) reports the status information of the remote clients, and cloud administrators periodically check the status of running instances (e.g., by accessing the execution and outcome logs 522). The status and QoS events are stored in the database. When an application is installed and executed, task QoS estimates and runtime QoS metrics are stored in the database. The stored information will be later utilized to create a QoS profile for the tasks and to enable the computation of the application QoS. The runtime data generated from application instances execution (e.g., generated by an instance executing on the cloud computing node 530) is propagated to one or more data structures in the database.

Figure 6:
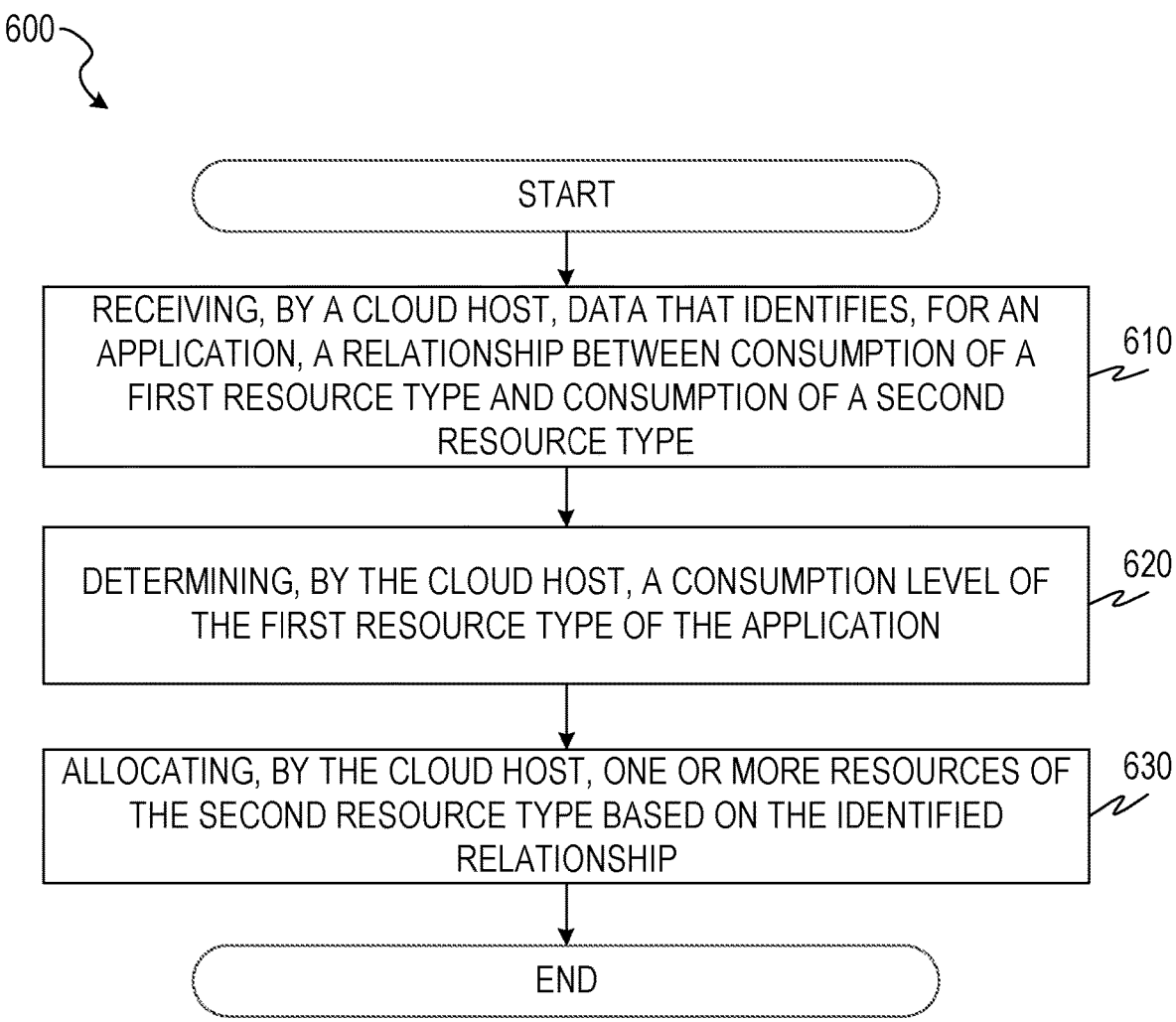
FIG. 6 is a flowchart of a method suitable for cloud QoS management, according to some example embodiments.

FIG. 6 is a flowchart of a method 600 suitable for cloud QoS management, according to some example embodiments. The method 600 includes operations 610, 620, and 630. By way of example and not limitation, the method 600 is described as being performed by the resource management system 180 using the modules of FIGS. 2, 4, and 5.

In operation 610, a cloud host (e.g., the resource management system 180 or the QoS manager 410) receives data that identifies, for an application, a relationship between consumption of a first resource type and consumption of a second resource type. For example, a customer of the cloud host may provide information to the customer preference module 360 for an application that identifies a relationship between consumption of CPU resources and consumption of I/O resources for the application. More specifically, the relationship may indicate a time delay between the increase in consumption of a first resource and an increase in consumption of a second resource. For example, an encryption application may initially consume CPU resources to generate an encryption key and seed data prior to actually beginning encryption of data and transmission of the encrypted data. As a result, the CPU usage of the encryption application will rise prior to the use of I/O resources by the application. Since the customer of the cloud host knows the type of application being hosted, the customer is able to provide this information to the cloud host.

In some example embodiments, the customer determines the relationship between consumption of the two resource types by adding performance measures to the program to gather data. Additionally or alternatively, operating system-generated logs can be examined to determine application performance.

In operation 620, the cloud host determines a consumption level of the first resource type of the application. In this example, the monitor module 365 determines a consumption level of processor resources by the encryption application.

In operation 630, the cloud host allocates one or more resources of the second resource type based on the identified relationship. In this example, the allocation module 370 allocates I/O resources to the application based on the relationship information provided in operation 610 and the consumption of processor resources determined in operation 620.

Figure 7:
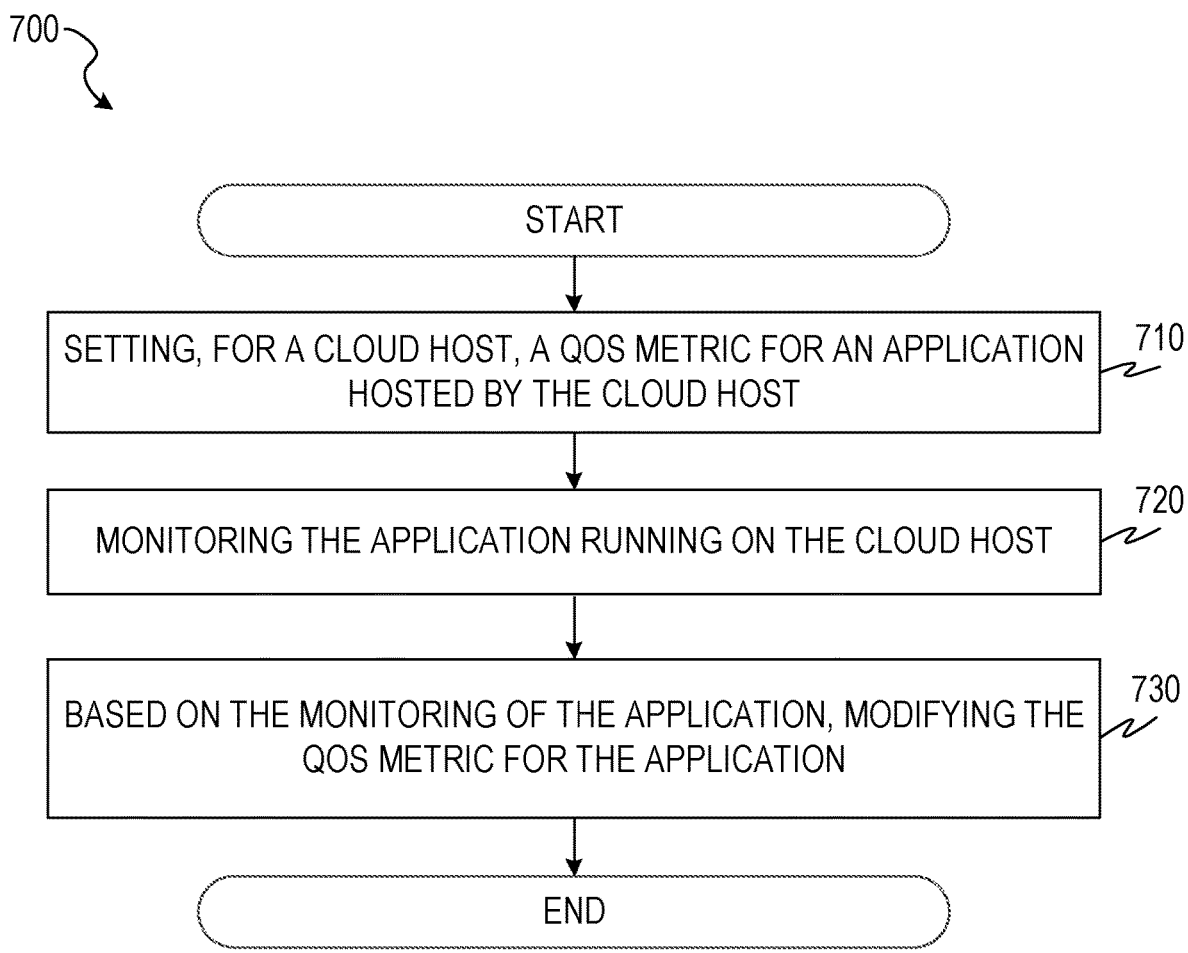
FIG. 7 is a flowchart of a method suitable for cloud QoS management, according to some example embodiments.

FIG. 7 is a flowchart of a method 700 suitable for cloud QoS management, according to some example embodiments. The method 700 includes operations 710, 720, and 730. By way of example and not limitation, the method 700 is described as being performed by the resource management system 180 using the modules of FIGS. 2, 4, and 5.

In operation 710, a QoS metric is set for an application hosted by the cloud host. For example, a user associated with the account may use a user interface presented by the cloud host (e.g., a web interface served by a web server of the cloud host and presented in a web browser on a client device of the user) to log into an account and, using the account, set a QoS metric for an application associated with the account. The setting for the QoS metric may be provided to the customer preference module 360 using the customer preference data structure 800 of FIG. 8 and stored in a database using the database schema 200. As an example, the QoS metric may indicate a rule that additional I/O resources should be allocated to the application 30 seconds after an increased demand for processing resources for the application is identified by the cloud host.

In operation 720, the account of the cloud host or the cloud host monitors the application running on the cloud host. For example, the SLA monitoring and control module 541 of the client device 540 may monitor the application via the monitoring module 526. As another example, the monitoring module 526 may monitor the application via communication with the SLA monitoring and control module 531 (or multiple instances thereof, one for each node of the cloud host being used by the application).

In operation 730, based on the monitoring of the application, the account of the cloud host or the cloud host modifies the QoS metric for the application. For example, the monitoring of the application may show that, even after the additional I/O resources are allocated according to the rule, I/O resources are initially under-allocated to the application. In response, the QoS metric may be modified to reduce the time delay before allocating I/O resources in response to processor demand, to increase the amount of I/O resources allocated in response to processor demand, or any suitable combination thereof. Similarly, if the monitoring of the application reveals over-allocation of resources, the QoS metric may be modified to reduce the allocation of resources, increase a delay of allocation of resources, or both.

In some example embodiments, modifying the QoS metric for the application is in response to monitoring of multiple applications. For example, a cloud host may have agreed to provide services capped by a certain number of CPUs or other resources. The customer may indicate a desired allocation of resources to a plurality of applications being run for the customer (operation 710), monitor the performance of the plurality of applications (operation 720), and, based on under-allocation of resources to a first application and over-allocation of resources to a second application, adjust the QoS metric for both the first application and the second application.

Figure 8:
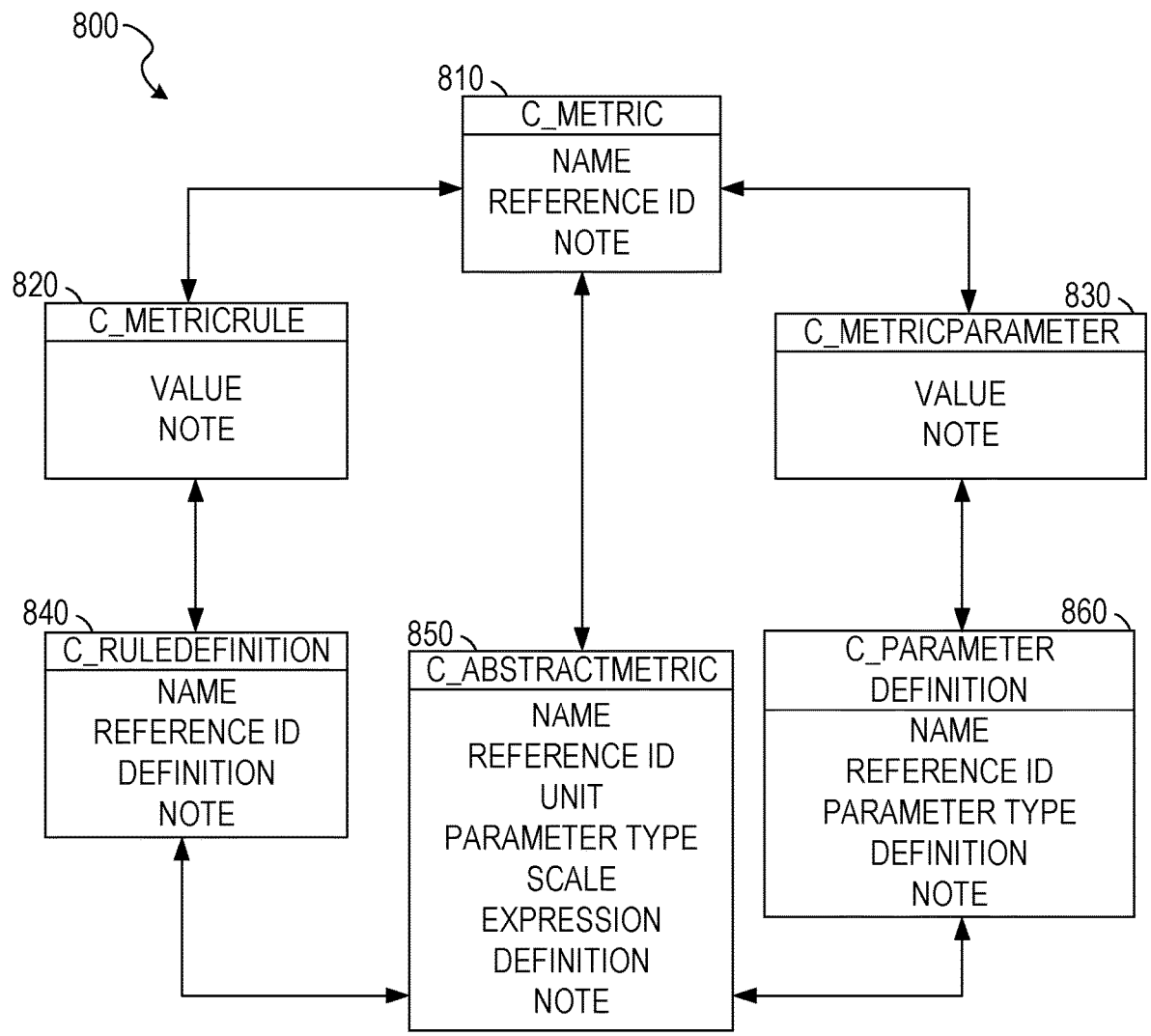
FIG. 8 is an illustration of a template for customer preference data structures, according to some example embodiments.

FIG. 8 is an illustration of a customer preference (CP) data structure 800. A customer preference data structure defines customer-specific rules for a cloud service provider to use when managing the QoS resources. A customer preference helps the cloud service provider to manage QoS service efficiently in order to improve customer service. The CP data structure 800 comprises a c_metric data structure 810, a c_metricrule data structure 820, a c_metricparameter data structure 830, a c_ruledefinition data structure 840, a c_abstractmetric data structure 850, and a c_parameterdefinition data structure 860. In various example embodiments, more or fewer component data structures are used in the CP data structure 800.

The c_metric data structure 810 includes a name, a reference identifier, and a note. The c_metricrule data structure 820 includes a value and a note. The c_metricparameter data structure 830 includes a value and a note. The c_ruledefinition data structure 840 includes a name, a reference identifier, a definition, and a note. The c_abstractmetric data structure 850 includes a name, a reference identifier, a unit, a parameter type, a scale, an expression, a definition, and a note. The c_parameterdefinition data structure 860 includes a name, a reference identifier, a parameter type, a definition, and a note.

In some example embodiments, customer preference data is provided as a table. For example, each column and row of the table may correspond to a resource type and the value of each cell indicates a degree of relationship between the resource type of the row with the resource type of the column of the cell. The degree of the relationship may be directional. For example, if increased CPU usage always causes increased I/O usage, the value in the cell for the CPU row and the I/O column may be 1.0, but if increased I/O usage only causes increased CPU usage 25% of the time, the value in the cell for the I/O row and the CPU column may be 0.25. Multiple tables may be provided for different time delays. For example, a first table may include values that show immediate relationships, a second table may include values that show relationships with a delay of 10 seconds, and a third table may include values that show relationships with a delay of 30 seconds. The amount of the delay may be indicated for the table. For example, a batch processing system that receives a data feed at midnight and generates reports at noon may have a characterizing table that shows increased CPU usage 12 hours after increased I/O usage.

Figure 9:
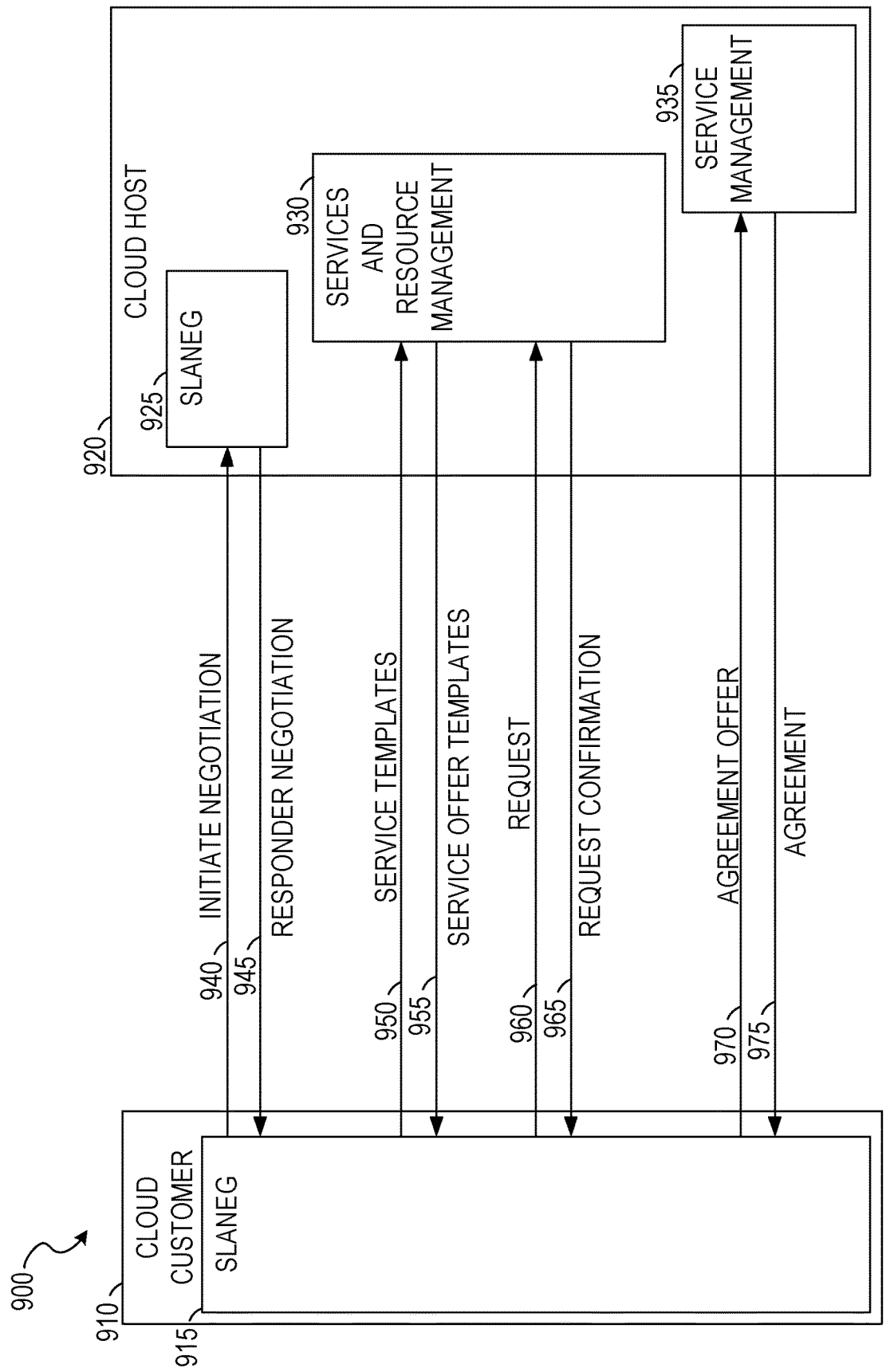
FIG. 9 shows a customer preference negotiation, according to some example embodiments.

FIG. 9 shows a customer preference negotiation 900, according to some example embodiments. The customer preference negotiation 900 is a negotiation between a cloud customer 910 and a cloud host 920 and comprises communications 940, 945, 950, 955, 960, 965, 970, and 975. The cloud customer 910 includes an SLA negotiator (SLANEG) 915. The cloud host 920 includes a SLANEG 925, a services and resource management module 930, and a service management module 935.

The SLANEG 915 initiates negotiation with the SLANEG 925 in communication 940. The SLANEG 925 responds with communication 945. For example, human negotiators that are employees of the cloud customer and the cloud host may enter negotiations. As another example, computer-implemented negotiator modules may begin negotiations. For example, the SLANEG 915 may be a module programmed to negotiate terms with multiple cloud hosts to determine the best performance available for a predetermined price.

Once negotiations are initiated by communications 940 and 950, the SLANEG 915 provides service templates to the services and resource management module 930 in communication 950. The service templates provide high-level information regarding the applications the cloud customer 910 intends to have hosted by the cloud host 920. The services and resource management module 930 of the cloud host 920 responds with service offer templates in communication 955. The service offer templates provide high-level information regarding the services offered by the cloud host 920. For example, the service templates may indicate that the cloud customer 910 intends to run a data-gathering application at night and to provide a critical web application to end users at all times. The service offer templates may indicate that the cloud host 920 provides multiple tiers of service, with different prices for each tier. Each tier may include different amounts of resources, on a fixed or elastic basis. For example, a fixed number of processors, a fixed network bandwidth, a fixed storage amount, or any suitable combination thereof may be defined for a particular service offering. As another example, a range of one or more of the resource types may be described, wherein allocation will be elastic, changing in response to the consumption needs of the application.

The SLANEG 915 provides a request for a specific combination of services in the communication 960. The services and resource management module 930 provides a confirmation of the request in the communication 965. The request may include one or more customer preference data structures 800. By using the customer preference data structure 800 or otherwise providing information regarding the consumption of resources by the specific application to be run, the cloud host 920 will better be able to provide the cloud services. Accordingly, the request confirmation may comprise an indication that the cloud host 920 is able to comply with the customer preference data included in the request.

In communication 970, the SLANEG 915 provides an agreement offer to the service management module 935 of the cloud host 920. The agreement offer may include one or more customer preference data structures or references to one or more customer preference data structures, along with price terms, dates of the agreement, and other details. The service management module 935 responds in communication 975 with agreement to the agreement offer. Alternatively, if the cloud host 920 rejects the offer, communications 950-965 may be repeated to allow the cloud customer 910 to determine the QoS features that are available from the cloud host 920 with the various service offer templates provided by the services and resource management module 930. Once agreement is reached, the cloud customer 910 may provide one or more applications to the cloud host 920 and the cloud host 920 may begin hosting the provided applications, according to the agreed-upon QoS terms. Thus, the technical details provided in the customer preference data structures may be incorporated into the contractual SLA between the parties.

Although the CP negotiation 900 shows the cloud customer 910 negotiating with a single cloud host 920, it is contemplated that negotiations with multiple cloud hosts may occur simultaneously. SLAs can be linked to capture interactions in multi-provider environments. Regarding SLAs for applications spanning multiple providers, the CP structure can also be used for SLA splitting, which allows for service-, resource-, or performance-based SLA splitting and revenue sharing/compensation provision. In addition, SLA violations may cause a process of negotiation to recur. SLA re-negotiation may also be triggered by the user when change in application parameters affect the QoS, by one of the providers who detects a SLA violation, or by the application following a scalability or elasticity rule.

Benefits of the systems and methods described herein include, in some example embodiments, direct coverage of the user terminals by the cloud QoS, support for end-to-end absolute QoS, a QoS guarantee for final users, optimized resource management, safety/permission control of access, direct content access, personalized QoS, and preservation of content access. The systems and methods described herein may be applied to multiple types of cloud edge computing scenarios to improve the cloud/edge computing resource allocation, improve cloud providers' benefits, save power and processing cycles, or any suitable combination thereof.

In some example embodiments, compliance with rules defined by a CP data structure (for a virtual machine (VM), resource, network, or any suitable combination thereof) is checked while configuring system parameters. Additionally or alternatively, compliance with rules defined by a CP data structure may be verified by observation (e.g., while configuring system parameters). A system may generate a log for recording all process flows.

Although a few embodiments have been described in detail above, other modifications are possible. Other components may be added to, or removed from, the described systems. Other embodiments may be within the scope of the following claims.

What is claimed is:

1. A computer-implemented method of executing an application using cloud resources comprising:
    transmitting, from a client device and to a first cloud host, data that identifies, for a first application, a relationship between consumption of a first resource type and consumption of a second resource type;
    transmitting, from the client device and to the first cloud host, quality of service (QoS) terms for executing, by the first cloud host, the first application;
    receiving, by the client device and from the first cloud host, an acceptance of the QoS terms;
    receiving, by the client device and from the first cloud host, QoS data regarding the execution of the first application by the first cloud host;
    comparing, by the client device, the QoS terms and the QoS data to detect a service level agreement (SLA) violation; and
    based on the SLA violation, automatically transmitting from the client device to a second cloud host, QoS terms for executing, by the second cloud host, a second application.

2. The computer-implemented method of claim 1, wherein the QoS terms comprise a QoS metric and a rule for the QoS metric.

3. The computer-implemented method of claim 2, wherein the QoS terms comprise a second QoS metric and a second rule for the second QoS metric.

4. The computer-implemented method of claim 2, wherein the QoS metric is a storage metric and the rule for the QoS metric specifies a minimum available storage size.

5. The computer-implemented method of claim 1, wherein the first resource type is an input/output (I/O) resource type and the second resource type is a processor resource type.

6. The computer-implemented method of claim 1, wherein the first resource type is an input/output (I/O) resource type and the second resource type is a storage resource type.

7. The computer-implemented method of claim 1, wherein the first resource type is a processor resource type and the second resource type is a storage resource type.

8. The method of claim 1, wherein the detecting of the SLA violation comprises detecting that the first cloud host is providing an uptime percentage of the first application that is below an uptime percentage defined in the QoS terms.

9. The method of claim 1, wherein the detecting of the SLA violation comprises detecting that the first cloud host is providing a response time for the first application that exceeds a maximum response time defined in the QoS terms.

10. The method of claim 1, wherein the detecting of the SLA violation comprises detecting that data for the first application is not being backed up in accordance with a back up period defined in the QoS terms.

11. A client device comprising:
    a memory storage comprising instructions; and
    one or more processors in communication with the memory storage, wherein the one or more processors execute the instructions to perform operations comprising:
        transmitting to a first cloud host, data that identifies, for a first application, a relationship between consumption of a first resource type and consumption of a second resource type;
        transmitting, to the first cloud host, quality of service (QoS) terms for executing, by the first cloud host, the first application;
        receiving, from the first cloud host, an acceptance of the QoS terms;
        receiving, from the first cloud host, QoS metrics data regarding the execution of the first application by the first cloud host;
        comparing the QoS terms and the QoS metrics data to detect a service level agreement (SLA) violation; and
        based on the SLA violation, automatically transmitting to a second cloud host, QoS terms for executing, by the second cloud host, a second application.

12. The client device of claim 11, wherein the QoS terms comprise a QoS metric and a rule for the QoS metric.

13. The client device of claim 12, wherein the QoS terms comprise a second QoS metric and a second rule for the second QoS metric.

14. The client device of claim 12, wherein the QoS metric is an input/output (I/O) metric and the rule for the QoS metric specifies a minimum I/O rate for the first application.

15. The client device of claim 12, wherein the QoS metric is a storage metric and the rule for the QoS metric specifies a minimum available storage size.

16. A non-transitory computer-readable medium storing instructions that, when executed by one or more processors, cause the one or more processors to perform operations comprising:
- transmitting to a first cloud host, data that identifies, for a first application, a relationship between consumption of a first resource type and consumption of a second resource type;
- transmitting, to the first cloud host, quality of service (QoS) terms for executing, by the first cloud host, the first application;
- receiving, from the first cloud host, an acceptance of the QoS terms;
- receiving, from the first cloud host, QoS metrics data regarding the execution of the first application by the first cloud host;
- comparing the QoS terms and the QoS metrics data to detect a service level agreement (SLA) violation; and
- based on the SLA violation, automatically transmitting to a second cloud host, QoS terms for executing, by the second cloud host, a second application.

17. The non-transitory computer-readable medium of claim 16, wherein the QoS terms comprise a QoS metric and a rule for the QoS metric.

18. The non-transitory computer-readable medium of claim 17, wherein the QoS metric is a storage metric and the rule for the QoS metric specifies a minimum available storage size.

19. The non-transitory computer-readable medium of claim 16, wherein the first resource type is an input/output (I/O) resource type and the second resource type is a processor resource type.

20. The non-transitory computer-readable medium of claim 16, wherein the first resource type is an input/output (I/O) resource type and the second resource type is a storage resource type.

* * * * *